(12) United States Patent  
Rakib

(10) Patent No.: US 8,826,359 B2  
(45) Date of Patent: Sep. 2, 2014

(54) HFC CABLE SYSTEM WITH SHADOW FIBER AND COAX FIBER TERMINALS

(75) Inventor: Selim Shlomo Rakib, Cupertino, CA (US)

(73) Assignee: Gainspeed, Inc., Sunnyvale, CA (US)

( * ) Notice: Subject to any disclaimer, the term of this patent is extended or adjusted under 35 U.S.C. 154(b) by 242 days.

(21) Appl. No.: 12/907,970

(22) Filed: Oct. 19, 2010

(65) Prior Publication Data

US 2011/0265140 A1 Oct. 27, 2011

Related U.S. Application Data

(63) Continuation-in-part of application No. 12/692,582, filed on Jan. 22, 2010.

(60) Provisional application No. 61/385,125, filed on Sep. 21, 2010.

(51) Int. Cl.
*H04N 7/173* (2011.01)
*H04N 7/10* (2006.01)
*H04N 7/22* (2006.01)

(52) U.S. Cl.
CPC ... *H04N 7/22* (2013.01); *H04N 7/10* (2013.01)
USPC ............................ 725/121; 725/117; 725/124

(58) Field of Classification Search
USPC ............ 370/349, 389, 468, 480; 398/26, 183, 398/115; 375/260, 316; 359/113, 114, 118, 359/124, 125, 137, 145, 152, 153, 154; 348/723, 725; 725/37, 81, 105, 126, 725/129, 131, 135; 385/86; 709/226; 345/73, 716, 722; 715/751, 753, 759; 717/113, 176
See application file for complete search history.

(56) References Cited

U.S. PATENT DOCUMENTS

| | | | | |
|---|---|---|---|---|
| 5,293,633 A * | 3/1994 | Robbins | ......................... | 725/144 |
| 6,075,972 A * | 6/2000 | Laubach et al. | ............. | 455/3.05 |
| 6,281,996 B1 * | 8/2001 | Krimmel | ............................ | 398/9 |
| 6,353,490 B1 * | 3/2002 | Singer et al. | .................... | 398/66 |
| 7,623,532 B2 * | 11/2009 | Liva et al. | ...................... | 370/401 |
| 2006/0140642 A1 * | 6/2006 | Brolin | ............................ | 398/183 |
| 2008/0159256 A1 * | 7/2008 | Faska et al. | ................... | 370/349 |
| 2008/0170853 A1 * | 7/2008 | Rakib et al. | ..................... | 398/26 |

OTHER PUBLICATIONS

John G. Proakis and Dimitris G. Manolakis, Digital Signal Processing Priciples, Algorithms, and Applications, !996 Prentice-Hall Inc Third Edition, p. 30.*

* cited by examiner

*Primary Examiner* — Nasser Goodarzi
*Assistant Examiner* — Adil Ocak
(74) *Attorney, Agent, or Firm* — Stephen E. Zweig

(57) ABSTRACT

System and method to extend the upstream data capacity of an HFC CATV system by extending a "shadow" optical fiber network deeper into the various CATV cable neighborhoods, with coax fiber terminals (CFT) spaced roughly according to the distribution of CATV active devices such as RF amplifiers. The CFT can intercept local upstream data from various neighborhood sub-regions and transform this upstream data into upstream optical data, thus relieving upstream data congestion in the 5-42 MHz CATV frequency region. The system can produce an order of magnitude improvement in upstream capability, while maintaining high compatibility with legacy HFC equipment. The CFT may exist in multiple embodiments ranging from low-cost "dumb" CFT to sophisticated CFT that can additionally provide GigE to the home (GTTH) service. Methods to maintain good compatibility with legacy CMTS devices, and methods to utilize DOCSIS MAP data for more efficient data transmission are also discussed.

20 Claims, 9 Drawing Sheets

Figure 5
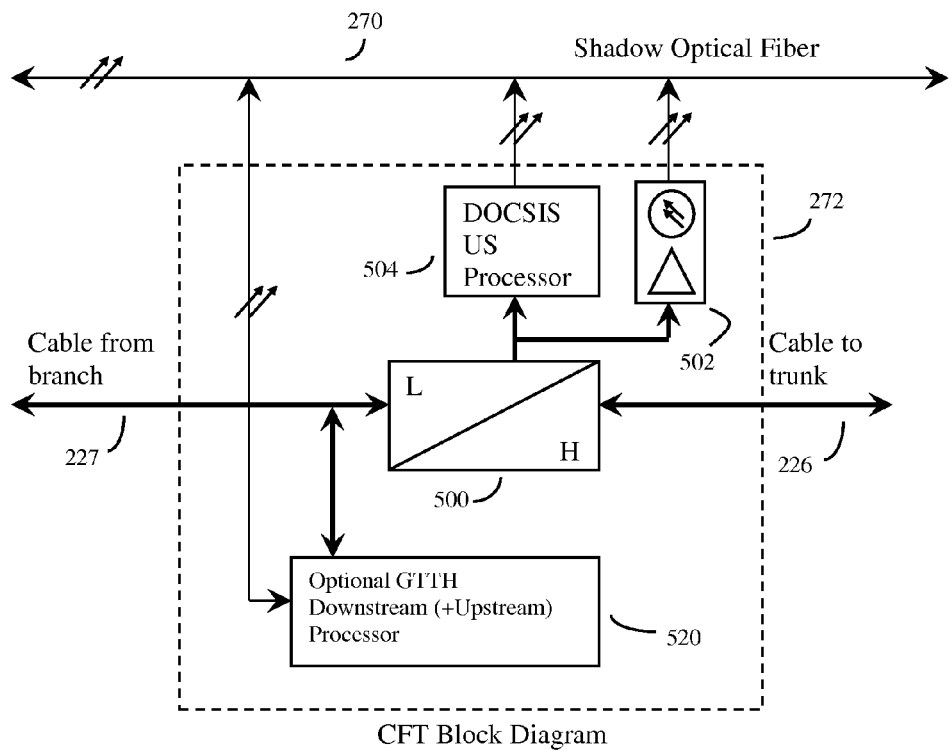
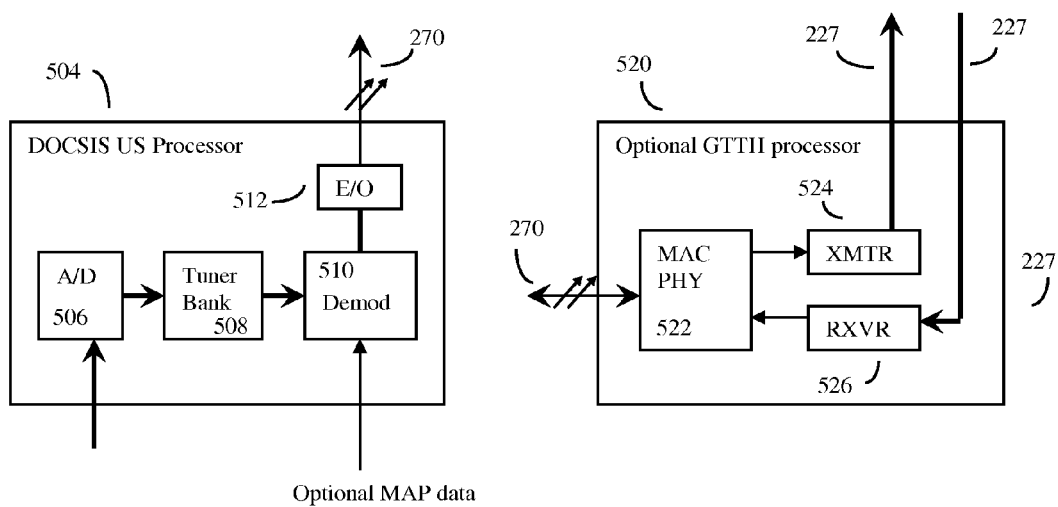

HFC CABLE SYSTEM WITH SHADOW FIBER AND COAX FIBER TERMINALS

CROSS REFERENCE TO RELATED APPLICATIONS

This application is a continuation in part of U.S. patent application Ser. No. 12/692,582, "DISTRIBUTED CABLE MODEM TERMINATION SYSTEM" filed Jan. 22, 2010, inventor Selim Shlomo Rakib; this application also claims the priority benefit of U.S. provisional application claims the priority benefit of U.S. provisional application 61/385,125 "IMPROVED HYBRID FIBER CABLE SYSTEM AND METHOD", filed Sep. 21, 2010, inventor Selim Shlomo Rakib. The contents of both applications are incorporated herein by reference.

FIELD OF THE INVENTION

The invention is in the general field of Cable Television and Hybrid Fiber Cable systems, particularly with regard to providing extended features and Internet access.

BACKGROUND OF THE INVENTION

Cable television (CATV), originally introduced in the late 1940's as a way to transmit television signals by coaxial cables to houses in areas of poor reception, has over the years been modified and extended to enable the cable medium to transport a growing number of different types of digital data, including both digital television and broadband Internet data.

Over the years, this 1940's and 1950's era system has been extended to provide more and more functionality. In recent years, the CATV system has been extended by the use of optical fibers to handle much of the load of transmitting data from the many different CATV cables handling local neighborhoods, and the cable head or operator of the system. Here the data will often be transmitted for long distances using optical fiber, and the optical (usually infrared light) signals then transformed to the radiofrequency (RF) signals used to communicate over CATV cable (usually in the 5 MHz to 1-GHz frequencies) by many local optical fiber nodes. Such systems are often referred to as hybrid fiber cable systems, or HFC systems. The complex electronics that are used by the cable operator to inject signals (e.g. data) into the system, as well as extract signals (e.g. data) from the system are often referred to as Cable Modem Termination Systems or CMTS systems.

In a typical HFC system, at the various optical fiber nodes, the optical fiber signals are transformed back into RF signals and are then carried by the various neighborhood CATV coax cables to various households. Unlike fiber, which can carry optical signals for extensive distances without significant signal strength attenuation, the RF signals attenuate fairly rapidly as a function of distance over the CATV coax cables. This attenuation versus distance function increases as the frequency of the RF signals increases. For example, using RG-59 cable, at 10 MHz, the RF signal attenuation versus distance is about 1.1 dB/100 feet, at 100 MHz, the RF signal attenuation versus distance is about 3.4 dB/100 feet, at 400 MHz, the attenuation rate is 7.0 dB/100 feet, and at 1000 MHz (1 GHz), the attenuation rate is 12 dB/100 feet. Other types of coax cables, such as RG-6 cables, have lower attenuation versus distance characteristics, but the same sort of attenuation problem still exists.

Thus, in order to maintain the RF signal of the various upstream and downstream signals while traveling over neighborhood CATV coax cables, neighborhood CATV systems typically employ various active (powered) devices, such as powered forward and reverse (bidirectional) RF amplifiers and the like. At present, using CATV systems that often have a maximum frequency of about 550 or 850 MHz, these active devices are often spaced about every 1000 feet.

Each active device can have several (e.g. 1-4) neighborhood CATV sub-cables connected to it, and often to maintain RF power over cable distances of several thousand feet, more than one (usually 1-3) active devices can be connected along a single stretch of coax cable. As a result, at a neighborhood level, the coax cable wiring pattern of CATV systems often has a "tree" like structure, where the branches of the tree spring off of the various active devices. The first or main CATV coax cable that connects to the RF signal originating from the optical fiber node is often referred to as the "trunk" cable, and the various coax cables that split off of the trunk cable are often referred to as branch cables, and the branch cables in turn can have other branch cables splitting off of them as well. As the various trunk and branch cables cover the local neighborhood, and generally situated in between the various active devices, various taps, splitters, and drops on the neighborhood or "trunk" CATV cable connect various households to the CATV cable. In order to provide power for the various active devices, often the CATV coax cable system will carry electrical power as well. As might be expected, the process of negotiating easements and right of way to route the neighborhood CATV cables is burdensome, however this process has been going on for over 50 years in various parts of the country, and by now is well established.

At present, in United States CATV systems, the 5-42 MHz frequency region is reserved for upstream communications back from the various cable modems to the cable plant, and the majority of the bandwidth, typically in the 54-547+ MHz range (often the upper end extends to 865 MHz and beyond) is reserved for downstream communications from the cable plant to the various households. European CATV systems follow a slightly different scheme where the upstream communications frequencies extend up to the 60 MHz region. Due to rapid signal attenuation, the higher frequencies above about 750 to 865 MHz (here referred to generically as 1 GHz+ frequencies) are seldom used at present.

A more detailed discussion of prior art in this field can be found in copending application Ser. No. 12/692,582, the contents of which are incorporated herein by reference.

Prior art work with various types of CMTS systems and fiber nodes includes Liva et. al., U.S. Pat. No. 7,149,223; Sucharczuk et. al. US patent application 2007/0189770; and Amit, U.S. Pat. No. 7,197,045.

BRIEF SUMMARY OF THE INVENTION

As previously discussed, at present only a relatively small amount of CATV cable bandwidth, typically in the 5-42 MHz frequency range, is allocated for upstream data transmission. As a result, especially as compared to the much greater amount of CATV bandwidth that is available for downstream data, the upstream data rate available to the various households connected to any given neighborhood CATV cable is comparatively limited.

Thus at present, there is a currently unmet need for methods to allow various CATV connected households (and businesses) to send higher amounts of data upstream. In addition to households and businesses, there is also an unmet need for methods to send other types of data, such as cellular phone data from local cellular telephone cell sites or cell towers, upstream to centralized locations.

Although the problem of higher data rates could, in principle, be solved by simply extending optical fiber networks directly to each household, in practice the high expense of this solution makes such Fiber to the Home (FTTH) solutions impractical.

The invention is based, in part, upon the realization that in today's world, often the functionality of HFC CATV systems that is most limiting to users is the very limited amount of available upstream bandwidth.

In one aspect of the invention, the functionality of HFC CATV systems may be extended by the use of a new, CATV neighborhood based, "shadow" optical fiber network. This shadow optical fiber network is not intended to replace the functionality of present CATV coax cables (CATV cables, cables), but rather to extend this functionality, particularly with regards to upstream data transmission. In some embodiments, with regards to downstream data transmissions, the present optical fiber nodes may continue to mark the end of the HFC optical fiber network, and the beginning of the RF based CATV cable network. However at least with regards to upstream data transmission, the invention teaches the advantages of continuing at least an alternative local shadow optical fiber network past the end point of the HFC downstream optical fiber node.

According to the invention, this alternative local shadow optical fiber network may continue roughly in parallel (i.e. generally following the same easements and routes) with the various neighborhood CATV cables up the neighborhood "CATV tree" to the various CATV coax active elements. Then generally, at or near the various active elements, a new type of low-cost fiber terminal, here designated a Coax Fiber Terminal (or CFT), may be used to segregate at least some of the upstream data from originating from households attached to that particular branch of the neighborhood tree, and ease the burden on the CATV coax cable upstream channel by sending this local upstream data back using the local shadow optical fiber network. In some embodiments, the Coax Fiber Terminals may optionally demodulate and repackage this upstream data, and send it back to the local optical fiber node where the upstream data can then optionally be further repackaged and sent upstream still further, usually ultimately to the cable head. In other embodiments, the various Coax Fiber Terminals can operate more as "dumb" devices that simply filter out the upstream data, convert to various wavelengths, and send it back to the optical fiber node. There, at the optical fiber node, the upstream data sent by various Coax Fiber Terminals at various wavelengths may then be repackaged and sent back to the cable head.

Since the data carrying capability of the neighborhood shadow optical fiber is much higher than that of cable, and in particular much higher than the limited amount of spectrum (e.g. 5-42 MHz) presently utilized for CATV upstream transmission, the net effect of the invention is to remove much of the present day upstream CATV transmission congestion and bottlenecks, while at the same time preserving backward compatibility with present CATV equipment. For example, where as before, 500 household cable modems, for example, might have to share the limited amount of upstream bandwidth on a neighborhood CATV cable, according to the invention, now perhaps only 50 cable modems would need to share upstream bandwidth along the particular branch of the cable that is served by their particular neighborhood active device and Coax Fiber Terminal (CFT). According to current upstream protocols, such as DOCSIS upstream protocols, which allocate upstream data capacity on a best efforts basis, this 10× decrease in congestion translates almost directly into a 10× increase in available upstream bandwidth.

According to the legacy DOCSIS scheme for allocating upstream bandwidth, the various household cable modems send requests for upstream bandwidth to the cable head, and the cable head allocates various time slots for upstream data transmission on a best efforts basis by sending Mini-slot Allocation Packet (MAP) messages to the various cable modems, releasing small time windows in which the various cable modems are authorized to send upstream data. Thus if the congestion is reduced by 10×, the available upstream time slots can become 10× larger, and 10× more upstream data can be transmitted.

Thus, for example, the invention can produce an effective order of magnitude or more increase in available upstream bandwidth, while still maintaining excellent backward compatibility with legacy HFC cables, cable modems, and even head end Cable Modem Termination Systems (CTMS).

BRIEF DESCRIPTION OF THE DRAWINGS

FIG. 5 shows a block diagram showing various embodiments of the Coax Fiber Terminal device. In some embodiments, the CFT can be a simple and dumb device that simply splits off all of the upstream data, converts it to an optical signal at various wavelengths, and sends it back along the shadow optical fiber without further processing. In other embodiments, the CFT can be a more sophisticated device that employs a DOCSIS upstream processor to more intelligently separate out upstream signals and also at least partially process the upstream signals. In other embodiments, the CFT can have additional circuitry to also inject high bandwidth downstream signals, often at very high frequency, thus allowing additional functionality such as Gigabit To The Home or GigE To The Home (GTTH).

DETAILED DESCRIPTION OF THE INVENTION

Figure 1:
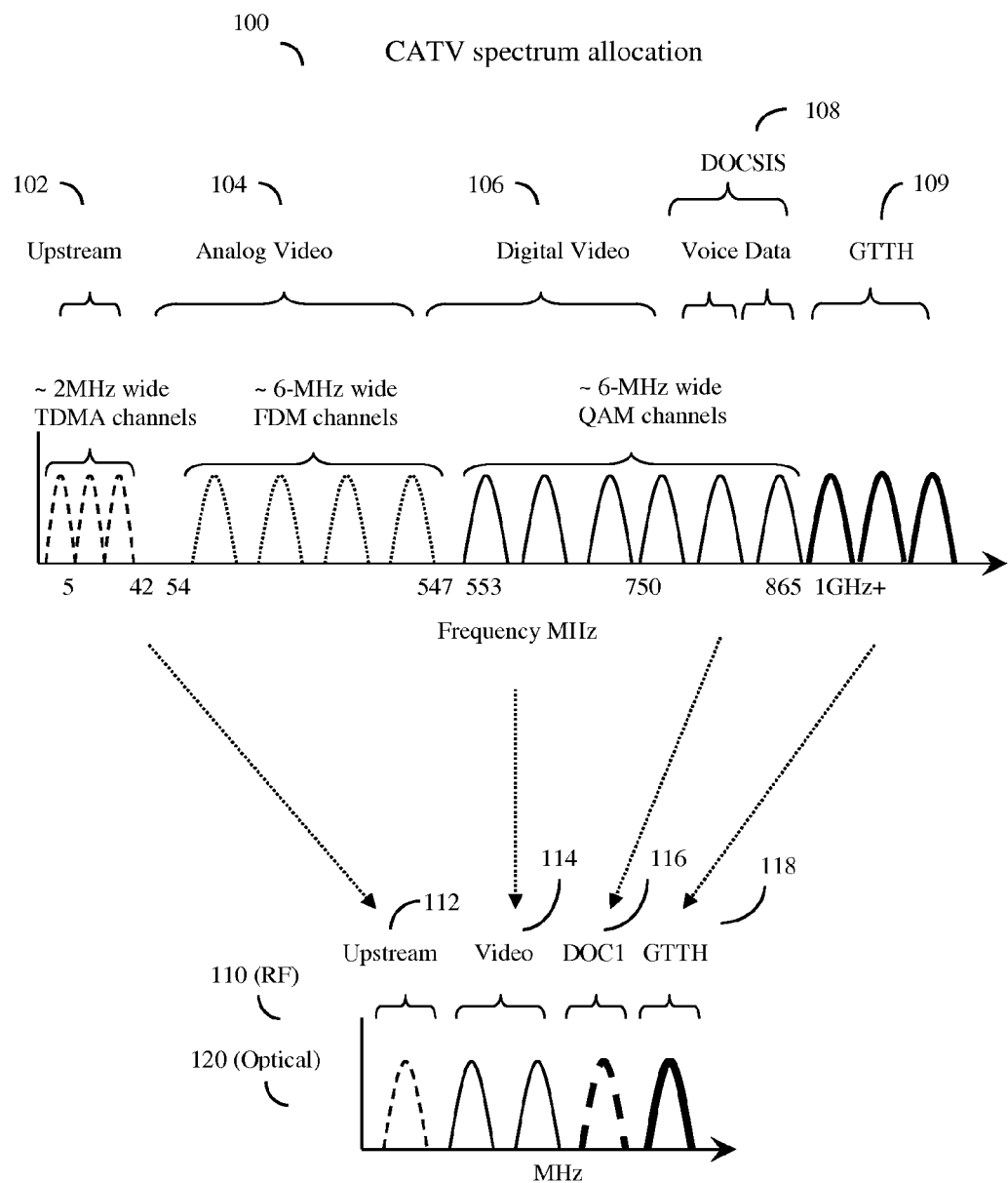
FIG. 1 shows an overall view of the various frequencies and data channels that are presently allocated for a typical CATV cable systems carrying legacy analog television FDM channels, QAM digital television channels, and various types of Data Over Cable Service Interface Specification (DOCSIS) data.

In one embodiment, the invention may be a method for enhancing the upstream data carrying capacity of a hybrid fiber cable (HFC) network. As a simplified overview, such networks can be considered to generally consist of a cable head with a Cable Modem Termination System (CTMS). The cable head will generally supply access to outside networks such as Internet, as well as various types of media content, television network and satellite feeds, and the like. The HFC network will also have at least one trunk optical fiber (typical HFC networks have many trunk optical fibers as well as various transport ring distribution hubs), and this at least one trunk optical fiber node will terminate in an at least one optical node that converts the optical signals back to radio frequency (RF) signals. Each optical fiber node will serve at least one neighborhood CATV trunk cable, and this cable in turn will provide CATV service to neighborhoods, often consisting of about 500 to 2000 homes or businesses (households).

As previously discussed, the amplitude of the high frequency CATV RF signals decays rapidly with CATV coax cable distance, and as a result, to compensate for this and to keep the signal strength of the CATV RF signals in the proper amplitude range, various active devices, such as line RF amplifiers, are connected to the CATV trunk cable at intervals of roughly every 1000 feet. The CATV trunk cable in turn will usually spits into a plurality of branch CATV cables, again having active devices such as line RF amplifiers every 1000 feet or so. The various households tap into the CATV branch cables at their respective locations, and connect their respective cable modems, set top boxes, and other CATV devices to the CATV cable in this manner. This type of trunk and branch CATV cable system has a wiring pattern that roughly resembles a tree, and is frequently referred to as a "tree and branch" or "trunk and branch" network or configuration.

As previously discussed, due to the historical nature of the CATV system, which allocated nearly all of the available range of cable frequencies (bandwidth) for downstream communications from the cable head to the various household subscribers, the amount of upstream bandwidth is very limited, and increasingly this has become a limiting factor, particularly as use of broadband Internet communications has expanded.

Although this problem could be solved by extending optical fiber to each household tapped into the CATV system, this type of solution is prohibitively expensive.

However according to the invention, there is a lower cost alternative that can make use of a new type of local optical fiber network, to act as a "CATV helper". This new type of local optical fiber network may run in parallel with various neighborhood trunk and branch CATV cables, and may act as an inexpensive but high bandwidth "return path" to backhaul upstream data, thus removing bottlenecks from the present highly congested and limited CATV upstream bandwidth region (typically 5-42 MHz). Because in this scheme, the optical fiber does not supplant the CATV RF cable, but rather runs in parallel or "shadows" the CATV RF cable through most of the CATV RF cable tree and branch structure, this local optical fiber "CATV helper" will be referred to as "shadow optical fiber".

According to the invention, each CATV neighborhood may have its own local shadow optical fiber network, and the different local shadow optical fiber networks between different CATV neighborhoods need not connect directly. Thus a wavelength or data packet being used in one local shadow optical fiber network generally will not need to be concerned with possible use of the same wavelength of time slice being used in another local shadow optical fiber network running in a different CATV neighborhood.

According to one embodiment of the invention, the upstream bandwidth or data carrying capability of the HFC system may be greatly improved by running at least one shadow optical fiber (often a local network of shadow optical fibers) from the optical fiber node that terminates the main HFC optical fiber(s) from the cable head. This shadow optical fiber may take advantage of existing CATV cable easements, and follow a route that generally parallels the route taken by the neighborhood tree and branch CATV cable. The shadow optical fiber interacts with the local CATV cable by way of a new type of device, here called a "Coax Fiber Terminal" device (sometimes abbreviated as CFT). Although in principle, the CFT may be located anywhere along the CATV cable that is convenient, often the CFT will be associated with legacy CATV coax cable active devices such as RF amplifiers.

Although the invention does not require that the shadow optical fiber run exactly in parallel or exactly along the same route as the neighborhood CATV cable, this approach is generally preferred. This is because in addition to the advantages of making use of previously established easements, often the various CFT devices will require electrical power to operate. Since CATV cable often is associated with power sources used to power the various CATV active devices (RF amplifiers), cost savings can be generated by tapping into these previously available power sources. Note that although the CFT devices are usually powered, the shadow optical fiber itself can be run as a passive optical network that may not otherwise need any power to operate.

A third advantage of running roughly in parallel with the legacy neighborhood CATV cable system is that at least some legacy CATV active devices, such as RF amplifiers, contain filters and other components that can potentially interfere with upstream communications as well as downstream communications at frequencies other than the legacy CATV frequencies. By positioning the CFT devices in roughly the same location as the CATV active devices, so that upstream CATV signals intercepted before they encounter any problems due to legacy CATV active devices. Further, as will be discussed, in at least some embodiments of the invention, next generation downstream signals outside of the legacy frequency range can be injected by the CFT devices into at least the regions of neighborhood CATV cable in-between the active devices. This can allow for new types of signals, such as 1 GHz+ RF signals, to be injected (or detected) without fear of interference by legacy CATV active devices.

Thus according to the invention, the various shadow optical fiber connected Coax Fiber Terminals are often connected directly to the portions of the neighborhood CATV cable that are served by one particular CATV active device. Consider a neighborhood CATV system with a several thousand foot tree and branch coax cable network that serves 500 homes. Further, consider a 1000 foot of section of the neighborhood CATV branch cable, serving 50 homes, that is spaced between a first CATV active device and a second CATV active device. This stretch of 50 homes will also be served by a shadow optical fiber connected CFT (Coax Fiber Terminal). Instead of the upstream signals from this stretch of 50 homes having to compete for scarce upstream time allocations with the 450 other homes on the neighborhood coax cable system, this stretch of 50 homes can have exclusive use of most or all of the upstream cable bandwidth. This is because the CFT device can siphon off the upstream signals originating from these 50 homes, and the CFT can in turn send these upstream signals back upstream using the much higher data carrying capability of the local shadow optical fiber network. The upstream congestion on the limited CATV upstream frequency range is markedly reduced. The net effect is not unlike taking a freeway of cars that is moving at a crawl during rush hour, and removing 90% of the cars on the freeway. Traffic can now move at a much higher rate, and new cars can enter the freeway without any extended delay.

Thus according to the invention, the Coax Fiber Terminals may intercept upstream CATV RF signals and remove at least some of these upstream signals from the tree and branch CATV cables connected to their respective CATV active devices. The Coax Fiber Terminals can then transduce these upstream RF signals to optical signals, which can then be carried back (backhauled) to the optical fiber node or other high bandwidth (high capacity) network, and ultimately often communicated back to the cable head and/or the CTMS unit(s) often located at or near the cable head.

As previously discussed, one big advantage of this approach is its excellent backward compatibility. The present DOCSIS scheme of upstream data transmission works on a best efforts basis, where cable modems request upstream time slots for communication, and the cable head/Cable Modem Termination System (CTMS) doles out permissions and authorizations to use these time slots on an as-available basis by sending back Mini-slot Allocation Packet (MAP) authorizations, which, for example, may dole out upstream time slots of $2^n*6.35$ microseconds per time slot. With, for example, 10× less upstream congestion, the widely implemented DOCSIS upstream allocation system will almost automatically allocate about 10× more time for each cable modem to transmit upstream data, thus resulting in a very large increase in effective upstream rate with essentially no change in the large installed base of household cable modems. By suitably tricking the CMRTS units at the cable head into thinking that they are simply dealing with many lengths of much less congested sections of neighborhood CATV cable, good backward compatibility with the large installed base of CMRTS units and software can also be maintained. These methods will be discussed in further detail shortly.

Although, in some embodiments, the Coax Fiber Terminals may remove some or all of the upstream RF signals (e.g. in the 5-42 MHz region), in other embodiments, in order to preserve backward compatibility with various aspects of legacy HFC systems, it will be advantageous to remove only some of the upstream RF signals, such as some of all of the DOCSIS upstream RF signals, and allow other legacy upstream RF signals, such as legacy DVB, Aloha, pilot and monitoring signals, and other non-DOCSIS upstream signals to persist (remain on) the CATV cable, and to continue to be carried upstream using the CATV cable.

When selective upstream removal is desired, there are two general options. In the first option, the Coax Fiber Terminal may, either by itself, or in conjunction with various filtering devices, simply selectively remove certain upstream RF frequencies, such as those frequencies typically used for DOCSIS upstream service, or allow other upstream frequencies to pass. Alternatively, the Coax Fiber Terminal may first remove all of the upstream RF frequencies, and then selectively regenerate certain upstream RF frequencies, such as those often used by legacy non-DOCSIS services, and inject these regenerated RF signals back onto the CATV cable, where they may then be carried back upstream. As previously discussed, in these types of embodiments, the Coax Fiber Terminal(s) may generally then convert at least the removed RF upstream signals to optical signals, and use the much higher data rate carrying capacity of the shadow optical fiber network to backhaul these upstream signals back to their desired destination, which again will often be a CTMS located at the cable head.

Often the Coax Fiber Terminals may be located at the junctions between various CATV cable branches. As a result, often it will be desirable to produce Coax Fiber Terminals that are capable of dealing with multiple CATV branches (often 1-4) at the same time and in the same device. For purposes of this specification, it should be assumed that the typical Coax Fiber Terminal device is equipped with the connectors to service up to four CATV cables, as well as inlet and outlet ports for the shadow optical fiber, and power connectors (for example to receive power from the CATV power source) as appropriate.

Generally, the Coax Fiber Terminal devices will operate by intercepting the upstream CATV RF signals, often from the section of the CATV cable served by one CATV active device such as an RF amplifier, but occasionally from a still larger portion of CATV cable.

In some embodiments, very simple "dumb" CFT devices may operate by simply filtering out the upstream frequency range, transducing the CATV upstream RF signals to one or more optical wavelengths (such as one unique optical wavelength per CFT device) using devices as simple as electrical to optical adapters, and then put the now optical CATV upstream signals onto the shadow optical fiber on an almost as-is basis. This particular method has the advantage of allowing extremely low cost Coax Fiber Terminal devices to be produced. Here, use of Dense Wavelength Division Multiplexing techniques, such as those discussed in the non-provisional version of copending U.S. provisional application 61/385,125, the contents of which are included herein by reference, may be useful. For example, since multiple "dumb" CFT devices may be connected to the same stretch of shadow optical fiber, the problem of distinguishing upstream signals from different "dumb" CFT devices must be solved. Here, one simple way is to tune the upstream wavelength of each "dumb" CFT device to a different wavelength. Multiple "dumb" CFT devices can now communicate upstream along the same length of shadow optical fiber using Dense (or not so dense as the situation requires) Wavelength Division Multiplexing. See FIG. 2 for a diagram of DWDM processes.

Alternatively, in other embodiments, the Coax Fiber Terminal device(s) may first digitize the upstream signals before transducing the upstream signals from RF to optical for fiber optic transmission on the shadow optical fiber (s). This digitization process can be a relatively unsophisticated process, such as a process in which the upstream RF signals are sampled at a rate, such as the Nyquist rate, that is at least twice the rate of the highest upstream RF frequency desired to be handled. The sampling can be done by high speed A/D converters, usually operating at an adequate A/D resolution, such as around 10 bits resolution, so as to adequately sample and digitize the upstream RF signals. Once digitized and sampled, the now digitized upstream signals can be handled by, for an example, digital signal processors or other types of computer processors. Some upstream RF frequencies may be digitally sampled and these may, for example, then be used to reconstitute legacy CATV RF signals intended to be reinjected back into the CATV cable by the Coax Fiber Terminal. Other digitized upstream data may be suitably modified and repackaged into alternate signal transmission formats more suitable for optical fiber transmission. For example, the timing of the DOCSIS upstream data packets may be altered to allow DOCSIS upstream data packets from multiple Cable Fiber Terminal devices (which to improve upstream bandwidth will often not be run in coordination with each other, and thus will be sending different upstream data packets during the same time intervals and thus will collide with each other) to better coexist when transmitted along the same optical fiber at the same wavelength. Various types of alternative data compression schemes (including MAP extraction methods to be discussed) may also be implemented, as desired.

The upstream CATV RF signals typically transmit digital data in the form of analog RF signals. By contrast, the upstream data sent over the optical fiber network can be more efficiently transmitted by using various optical fiber digital protocols, such as Ethernet and GigE protocols. In order to more efficiently repackage the upstream CATV RF data for upstream optical fiber transmission, either at the Cable Fiber Terminal stage, or alternatively at stages above this (such as at the optical fiber node that feeds this particular neighborhood CATV cable tree and branch network), the digital data carried by the analog CATV RF signals can be extracted and repackaged into more efficient optical data carrying formats as desired.

To do this, it is very helpful if the system is able to understand the underlying structure of the CATV upstream RF signals, and if the system can use this structure information to extract the underlying data carried by these CATV upstream RF signals. This way the data itself can be carried, without the need to carry the large amount of extraneous "overhead" information that is also part of the RF CATV upstream signal.

To do this data extraction process, the various RF data and signal format parameters must be known. For example, the system needs to know information such as: "what upstream frequencies and time slices carry digital data from what cable modem?" To do this, it is helpful if the local system can obtain access to the Mini-slot Allocation Packet (MAP) data that has been assigned to the various cable modems, and/or utilize sniffing techniques to read and interpret the RF CATV upstream data. Here methods such as the sniffing methods of Azenko and Rakib, U.S. Pat. No. 7,362,773, the contents of which are incorporated herein by reference, may be useful.

Using this method of data extraction, in some embodiments, the system may, for example, digitize the upstream CATV RF signals by obtaining the Mini-slot Allocation Packet (MAP) data for at least some of the upstream CATV RF signals, and then use this Mini-slot Allocation Packet (MAP) data to demodulate and extract at least some of this upstream digital information. Again this process can often be performed by digital signal processors (DSP) or other computer processors that may either be included as a part of the Coax Fiber Terminal devices, or alternatively can be done further upstream, such as at the first optical fiber node.

Once the data has been extracted, it can then be repackaged by the system into an alternative format, such as an optical Ethernet format, suitable for optical transmission along the shadow optical fiber network or at the main optical fiber network that ultimately connects to the cable head.

Once at the cable head, the upstream digital data may then be used directly by the system. However such direct use will require the development of new types of CTMS software and potentially hardware as well.

To avoid the expense of developing new CTMS systems, in an alternative embodiment, legacy CTMS systems may be used. To do this, the upstream digital data, which has now been carried back from the neighborhood shadow optical fibers, back through the HFC optical fiber, and is now back at the head end, can be reconstituted back into its original CATV RF format, and then fed directly into a legacy CMTS system. This reconstitution method can "trick" the legacy CTMS system into thinking that it is simply dealing with much less congested neighborhood CATV cables. Here, due to the flexibility of the original "best efforts" DOCSIS upstream system, the legacy CMTS system and legacy DOCSIS software will continue to act on a best efforts basis, and thus release many more upstream time slots for the various cable modems to use for upstream data. Thus with almost no change to legacy CMTS and cable modems, the shadow optical fiber— Coax Fiber Terminal system can be used to implement a massive improvement in the upstream data capabilities of legacy HFC and CATV equipment, and at relatively low cost.

To reconstitute the original neighborhood upstream CATV RF signals at the cable head end, in some embodiments of the invention, at the cable head, a head end reconstitution device will use the Mini-slot Allocation Packet (MAP) data to subsequently remodulate the upstream digital information into reconstituted upstream CATV RF signals. Thus for example, MAP data showing that a particular neighborhood cable modem had been assigned a particular time slot and frequency for sending its digital information can be used to repackage the digital data according to the originally assigned MAP time slot, and produce the same type of RF waveforms in the correct time slots. As needed, the reconstitution device (usually a DSP or computer processor connected to various upstream RF generators such as QAM generators) may also simulate or correct for various timing delays that had originally been present in the HFC system before the conversion to the shadow optical fiber system had been done, thus enabling the legacy head end equipment, such as the CTMS, to continue to function with minimal amounts of software upgrades and adjustment required.

Further Enhancements:

Although the specification has largely focused on the inventions ability to deliver improved upstream bandwidth, once the shadow optical fiber has been installed in the various respective neighborhoods, this shadow optical fiber may also be used to increase the bandwidth of downstream data (e.g. cable head to household) as well. Here again, the shadow optical fiber system need not supplant the neighborhood CATV system, and it need not simply act as a prior art optical fiber node. Rather, in some embodiments, the shadow optical fiber system may simply extend the functionality of the upstream portion of the CATV cable system still further.

As previously discussed, one problem that stands in the way of utilizing very high frequency (e.g. above 1 Gigahertz) RF signals in CATV coax cables is that such high frequency signals decay more rapidly with distance than lower frequency signals. Thus while before it may have required an economically unfeasibly large number of CATV active devices to propagate 1 GHz+ downstream RF signals, by using an alternative form of the invention's shadow optical fiber and CFT terminals, this expense may be reduced. In this alternative embodiment of the invention, additional data, such as Gigabit To The House or GigE To The House (GTTH) downstream data (as well as other types of data) may be transmitted using the shadow optical fiber network, and the short range very high frequency signals generated at the CFT terminals, and the problem of high signal attenuation of as a function of distance for such high frequency (e.g. 1 GHz+) RF signals in CATV coax cable networks can be avoided or minimized.

This scheme also preserves much backward compatibility. For example, since the CFT devices can inject high frequency (e.g. 1 GHz+) RF signals into regions between the various legacy CATV active devices, then the legacy CFT devices (again usually RF amplifiers) do not themselves necessarily have to be upgraded to handle such high frequencies.

Further, since the scheme uses presently non-allocated CATV frequencies, the various legacy cable modems and other devices (e.g. set top boxes) also need not be upgraded. Rather, new devices, such as GTTH GigE terminals, and other new CATV devices may simply be obtained and put in the various households to provide downstream GigE service as needed. Here for simplicity, this potentially broad range of different types of cable modems, set top boxes, Ethernet terminals, and other cable connected household devices (e.g. televisions, radios, remote control devices, etc.) will simply be referred to generically as cable modems or occasionally as cable modems and Ethernet terminals.

These new devices can then use the shadow optical fiber to communicate with higher bandwidth upstream as well, either by utilizing the present 5-42 MHz upstream bandwidth as previously described, or alternatively by carving out a new region of the presently unused high frequency CATV bandwidth (e.g. again in the 1 GHz+ frequency region) to define a new upstream data channel. Here, given the great interest in Gigabit Ethernet data, in some embodiments of the invention, this new and higher capacity GTTH system may often use various Gigabit Ethernet signal transmission protocols. However the system is general purpose, and other services, such as additional QAM channels carrying extended video, telephone, music or other media may also be transmitted in this manner.

FIG. 1 shows an overall view of the various frequencies and data channels allocated for CATV (100). Typically the lower frequencies, such as 5-42 MHz, are allocated for use in transmitting data "upstream" from the individual cable modems back to the Cable Head or Cable plant (102). Typically upstream data is transmitted using a time-share TDMA (Time Division Multiple Access) manner in which MAP data is sent to individual cable modems which allocates certain times on roughly 2 MHz wide QAM channels to transmit data. Starting at around 54 MHz on up to roughly 547 MHz, space was previously allocated for legacy analog video channels (104), which transmit on roughly 6 MHz wide FDM channels. At frequencies above that, frequencies (space, bandwidth) is currently allocated for digital television transmitting on roughly 6 MHz wide QAM channels (106), and above that, space is currently allocated for DOCSIS services (108) that may transmit voice, on-demand video, IP, and other information, again generally as a series of 6 MHz wide QAM channels. Above about 1 GHz, cable bandwidth is seldom used at present (109), although future services, such as the GTTH services and high bandwidth upstream services discussed in this application, may extend further into this region. Because some CATV systems involve different high frequency cutoffs than other CATV systems, here use of the term "1 GHz+" or 1 GHz plus" is intended to concisely convey the idea of transmitting additional information at frequencies that are above the previously assigned high end CATV frequency. Thus in a CATV system with a previous 750 MHz cutoff, "1 GHz+" is intended to mean frequencies above 750 MHz. In a CATV system with a previous 865 MHz cutoff, "1 GHz+" is intended to mean frequencies above 865 MHz, and so on.

CATV cable (at least below about 850 MHz) thus has a finite bandwidth of at most about 100-200 QAM channels. When this bandwidth is used to serve a large amount of different customized types of data to a large amount of different subscribers, this bandwidth quickly becomes exhausted.

A drawing showing how the CATV spectrum allocation can be described in a more simplified diagram is shown below (110), (120). The "upstream" segment (112) is an abstraction of all upstream channels, including both presently used upstream channels in the 5-42 MHz region, as well as present and future higher frequency upstream DOCSIS channels. The "video" segment (114) is an abstraction of both the now obsolete analog TV FDM channels, as well as the standard "digital video" channels, as well as the projected digital video channels that will occupy the soon to be reclaimed analog bandwidths once the analog channels are phased out. Segment (114) also represents other standard digital radio and FM channels, and in general may represent any standardized set of downstream channels that will usually not be customized between different sets of users and neighborhoods.

The "DOC1" channel (116) may be (depending upon mode of use) either a full set or subset of present DOCSIS channels. The "IP/On-demand or GTTH channel (118) may be the higher frequency range of the CATV spectrum, such as the 1 GHz plus region, where various new GTTH services may be provided using the shadow optical fiber network and the various Coax Fiber Terminal devices.

Figure 2:
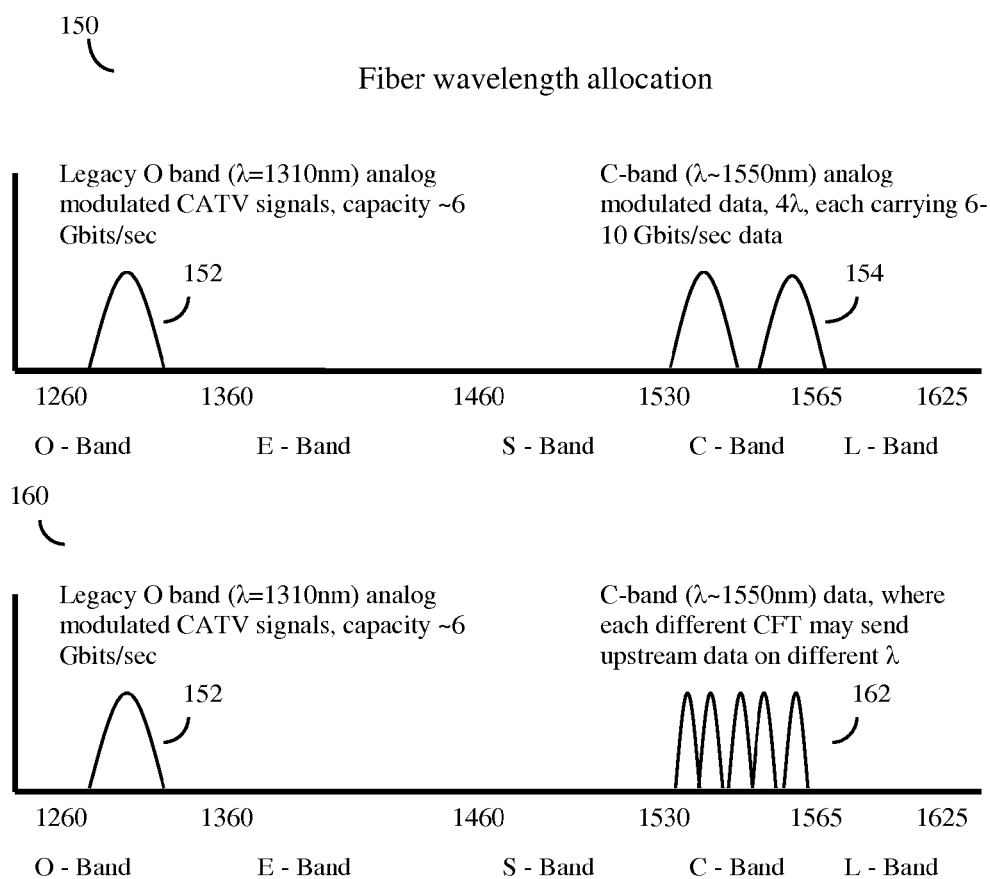
FIG. 2 shows an overall view of the various wavelengths allocated for prior art optical fiber wavelength division multiplexing schemes (150), as compared to alternative dense wavelength division multiplexing (DWDM) methods, which in some embodiments of the invention may be used by the shadow optical fiber network to carry upstream data (160).

FIG. 2 shows an overall view of the various optical wavelengths allocated for both prior art optical fiber wavelength division multiplexing schemes, and in some embodiments for various shadow optical fiber upstream data and/or GTTH data according to the invention.

Here the optical fiber wavelengths being used at present (150) include a 1310 nm O-band wavelength (152) often used to transmit the various CATV RF channels, such as the various QAM channels, modulated essentially according to the same CATV RF waveforms, but at optical wavelengths according to scheme (120). Supplemental data is often transmitted in the C-band around 1550 nm (154), often on optical wavelengths that, because they are modulated according to non-optimal CATV waveforms, must be separated from each other by a relatively large wavelength separation, and which carry sub-optimal amounts of data per wavelength.

Depending upon the particular embodiment, the shadow optical fiber network may transmit upstream data, or backhaul data, according to either prior art methods, or alternatively according to various multiple wavelength or Dense Wavelength Division Multiplexing methods (160). For example, in one simple embodiment, each different "dumb" Coax Fiber Terminal in a neighborhood may transmit its particular upstream data using a different optical fiber wavelength, at least as far as the first optical fiber node. There, at the first optical fiber node, the upstream data can then be demodulated, analyzed, and repackaged. This scheme results in very low cost Coax Fiber Terminals, since each may just consist of a filter, O/E converter, and a tuned laser diode. The more costly signal analysis and repackaging components can be thus relegated to the optical fiber terminal.

Alternatively, in alternative embodiments, more capable Coax Fiber Terminals can carry more of the load of upstream data analysis and repackaging, in which case fewer optical fiber wavelengths may be needed to transmit upstream data over the neighborhood shadow optical fiber network. Note that, as previously discussed, each neighborhood will generally have its own shadow optical fiber network, so that in this scheme, different shadow optical fiber wavelengths and timing windows may often be reused between neighborhoods without problems of interference.

Here again, a legacy O-band analog signal may be used for upstream communications as desired. Alternatively, multiple wavelengths of more efficiently modulated data signals (such as one of the various optical fiber GigE protocols) are sent, often as a series of closely spaced wavelengths (162).

Figure 3:
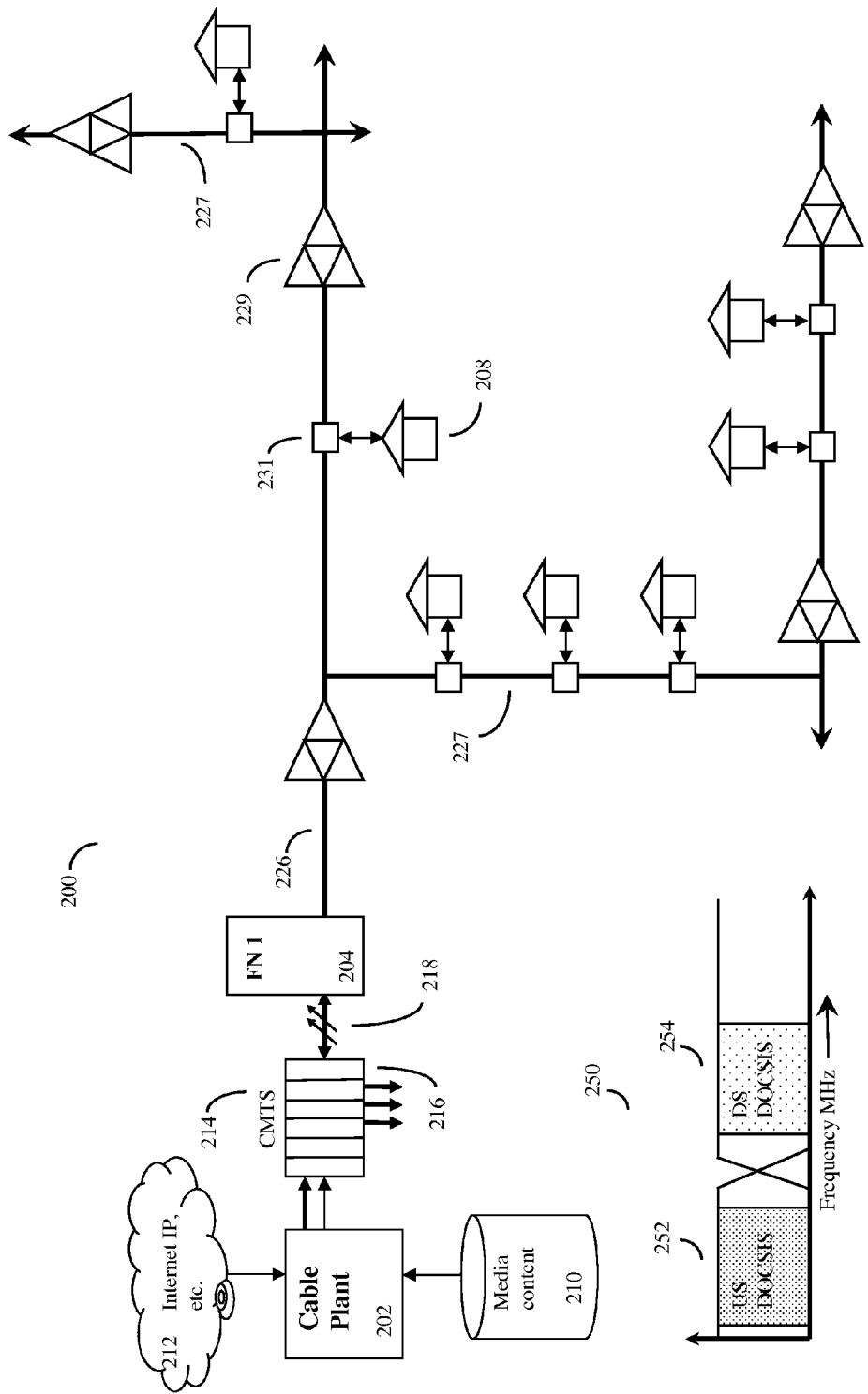
FIG. 3 shows a simplified version of how prior art HFC systems transmit data from the cable plant or cable head to different optical fiber nodes, each usually composed of a tree and branch like structure of CATV coax cables, often containing multiple active devices (e.g. RF amplifiers) spaced roughly every thousand feet.

FIG. 3 shows a simplified version of how prior art HFC systems (200) transmit data from the cable plant or cable head (202) to different optical fiber nodes (204), each usually composed of a tree like trunk (226) and branch (227) structure of CATV cables (226) with active devices, such as RF amplifiers (229), often every thousand feet or so. Each neighborhood will typically consist of up to several hundred or a few thousand different houses, apartments, offices or stores (208) (here referred to generically as "houses"), each equipped with their own cable modems (not shown) and connecting to the CATV cable via a tap (231) Here, for simplicity, only the downstream portion of the HFC system is shown.

The cable plant will obtain standardized media content (210) (such as a standard assortment of analog and digital video channels) from one set of sources, and also obtain more individualized data (212), such as video on demand, IP from the Internet, and other individualized data from other sources. This data is compiled into a large number of different QAM (and at present also FDM) modulated CATV broadcast channels at the CTMS shelf (214). This CMTS (214) will often have a number of different blade-like line cards (216). These line cards transmit the signals by optical fibers (218) to different areas (groups of neighborhoods).

As previously discussed, typical HFC networks actually have a rather complex topology, which here is greatly simplified. Rather than sending one optical fiber from the CTMS to each different neighborhood, typically optical fibers will serve multiple neighborhoods. To do this, the signal from the CTMS side optical fiber (218) will at least usually be split by an optical fiber splitter (not shown) into several different optical sub-fibers, and each sub-fiber in turn will in turn carry the signal to different fiber optic nodes. Here only one Fiber Node, Fiber Node 1 (204) is shown in order to better show the trunk and branch coax cable structure of the neighborhood CATV cable system.

At a fiber node, such as FN 1 (204), the optical signal is converted into a CATV radio frequency (RF) signal and sent via CATV cables (226) to individual cable modems at individual houses (208) in each neighborhood. Typically each neighborhood will consist of between 25 to a few thousand households, served by a CATV cable tree and branch like system of connected cables and active devices such as RF amplifiers (226), (227), and (229) that in turn connects to the local fiber node (204).

The CATV RF spectrum of this prior art HFC system is shown as (250). Here, at least in the US, the 5-42 MHz frequency region is reserved for upstream signals (252) such as upstream DOCSIS signals (US DOCSIS) going from the households (208) to the cable head (such as the CTMS (214), and the 54-865 MHz frequency region (254) is reserved for downstream signals, such as downstream DOCSIS (DS DOCSIS) going from the cable head to the households (208). Here the US DOCSIS region (252) is drawn as fairly dark (congested with dots) to symbolize the high upstream congestion that occurs when an entire neighborhood of households attempts to send upstream data on this relatively limited region of CATV cable spectrum.

Figure 4:
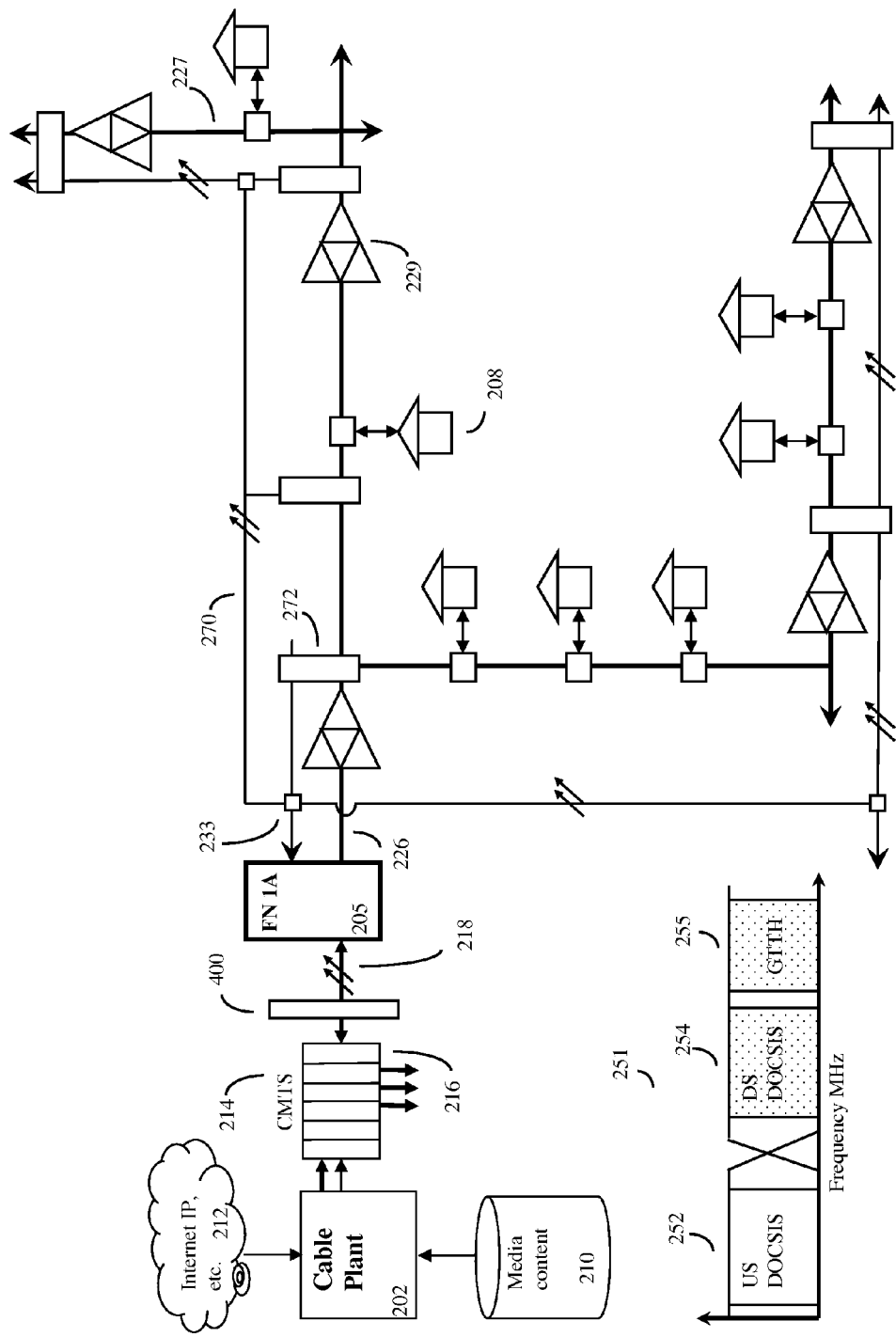
FIG. 4 shows how the invention's "shadow optical fiber" can be routed along the same easements, paths and conduits used to carry the neighborhood CATV cable tree and branch coax cables. This shadow optical fiber can, in turn, interact with a new type of "Coax Fiber Terminal" device (CFT). These CFT devices are often positioned on, in, or near the CATV active devices. The CFT devices can remove some or all of the upstream RF signals traveling back from the various households along the particular CATV branch cable or trunk cable serviced by that particular active device. The CFT devices then can transform at least some of the upstream CATV RF signals and data into upstream optical signals and data, and transmit this back to the optical fiber node and then to the cable head, thus relieving upstream congestion on the neighborhood CATV cables.

FIG. 4 shows how the invention's "shadow optical fiber" (270) can generally be routed along the same easements, paths and conduits used to carry the neighborhood CATV cable trunk (226) and branches (227). This shadow optical fiber can in turn interact with Coax Fiber Terminals (272) which are devices, usually positioned on, in, or near the CATV active devices (e.g. RF amplifiers 229), that can remove some or all of the upstream RF signals traveling back from the various households (208) along the particular CATV branch cable (227) or trunk cable (226) serviced by that particular active device (229). The Coax Fiber Terminals (272) can then transform the upstream CATV RF signals and data into upstream optical signals and data, and this can be carried back to the cable head, often by way of modified optical nodes (205) via the HFC system.

In some embodiments, these modified optical nodes (205) can, at least in part, be based on CMRTS or D-CMRTS optical nodes as described in copending application Ser. No. 12/692, 582 and/or provisional application 61/385,125; the contents of both are incorporated herein by reference.

According to the invention, either prior art optical nodes may be used, and additional devices may be added to intercept upstream data from the shadow optical fiber network (270) and repackage this for transmission back to the cable head, often along optical fiber route (218), often using alternate fibers or alternate wavelengths. Alternatively, the optical node may be modified into a modified optical node (205) with additional components to handle this repackaging internally.

In some embodiments, at the cable head, often just before the CMTS, a decoder apparatus (400) may intercept the optical fiber signals (218) and decode them into a form that can then be recognized by the CMTS. For example, such decoding may be used interpret the CFT domain information into a form that the CMTS can process, and may, for example, make each different Cable Fiber Terminal domain appear to the CMTS as if it is a separate CATV neighborhood. The decoder apparatus may also, in some embodiments, reconstitute upstream data signals coming from the Cable Fiber Terminals by way of MAP data or other methods. This will be discussed shortly.

In contrast to the CATV spectrum diagram (250) shown in FIG. 3, the CATV spectrum diagram (251) shown in FIG. 4 is slightly different. In particular, because much or all of the upstream traffic is now going by way of the shadow optical fiber line (270), the upstream bandwidth (252), such as might be used to carry upstream DOCSIS (US DOCSIS) is much less congested, and is thus shown without the dense pattern of dots to symbolize this difference. By contrast, the downstream DOCSIS (DS DOCSIS) (245) bandwidth can remain much the same as before. However, as is discussed elsewhere in this specification, the very high frequency region, such as the 1 GHz+ region, may in some embodiments of the invention also be used by the shadow optical fiber (270) and Coax Fiber Terminals (272) to deliver high bandwidth services, such as GigE to the home (GTTH).

Here, the shadow optical fiber system and the Coax Fiber Terminals are very compatible with this new type of high frequency CATV service, because this high (near 1 GHz) frequency range is attenuated rapidly as a function of distance in Coax cables. As previously discussed, according to the invention, some embodiments of the Coax Fiber Terminals can be used to inject these high frequency signals at multiple points along the CATV cable, thus bypassing the legacy RF amplifier active devices (229). Thus higher range service can be installed while still using most of the legacy HFC hardware.

Assuming that the shadow optical fiber network is a passive optical network, then simple beam splitters can be used (233) to split and combine the various passive optical fibers. This helps lower the cost of the shadow optical fiber network, and allows the capabilities of the shadow optical fiber network to be gradually improved over time by swapping in (and out) more and more capable CFT devices—e.g. on progression may go from "dumb" CFT devices to smarter upstream repackaging CFT devices to GTTH capable CFT devices, all without requiring any changes to the basic local shadow optical fiber network itself.

FIG. 5 shows a block diagram of various embodiments of the Coax Fiber Terminal (272), along with some details of the Coax Fiber Terminal's optional DOCSIS upstream processor and the Coax Fiber Terminal's optional Gigabit To The Home (or GigE To The Home) (GTTH) processor.

In its simplest form, a "dumb" Coax Fiber terminal can consist of little more than a Low Frequency/High Frequency filter (500) coupled to a simple electrical to optical converter (502), thus passing all upstream signals through to the shadow optical filter, often at a wavelength unique to that particular Coax Fiber Terminal (272). However in alternate embodiments, the direct electrical to optical converter (502) may be omitted, and instead the filtered upstream RF signals may be digitized and then further processed by a DOCSIS upstream processor (DOCSIS US Processor) (504).

This DOCSIS upstream processor may comprise, for example, a high speed A/D tuner, (506) a tuner bank (or software version of a tuner bank) for tuning into specific upstream frequencies (508), a demodulator such as a high speed processor or Digital Signal Processor (DSP) (510) to either extract the data from these frequencies, and/or repackage the data into an alternate form for transmission over the shadow optical fiber (270), and at least one electrical to optical converter (512). As will be discussed, in some embodiments, the demodulation process may be facilitated by informing the demodulator of the Mini-slot Allocation Packet (MAP) data associated with the various cable modems handled by the Coax Fiber Terminal (514). This will be discussed shortly.

In other embodiments, as previously discussed, the Coax Fiber Terminal may additionally be used as a convenient location from which to inject very high frequency CATV signals, which propagate only for short distances through Coax cable, but which are very useful at supplying high bandwidth data for various applications such as GTTH service. In these alternative embodiments, the Coax Fiber Terminal may additionally comprise an optional GTTH downstream processor (520). This optional GTTH downstream processor may comprise MAC and PHY units (522) which receive downstream data from the shadow optical fiber (270), and in turn send it to a suitable RF transmitter (524) which may generate suitable high frequency RF signals, such as 1 GHz plus signals capable of transmitting Gigabit Ethernet data, or other data and modulation protocols as desired. Although the optional GTTH processor may only transmit downstream data, and need not transmit any upstream data at all (this being handled by the DOCSIS upstream processor 504), in some embodiments, it may be useful to utilize at least some of the very high frequency 1 GHz+ frequency range for upstream transmission as well. In these embodiments, then the optional GTTH processor may also contain a receiver unit (526) capable of receiving the quickly attenuated 1 GHz+ frequency range upstream transmissions from next generation cable modems or household GigE interfaces, and in turn transducing these to optical signals suitable for transmission on the shadow optical fiber network.

As previously discussed, in some situations, the invention may be used to provide an inexpensive upgrade path to legacy systems as a series of steps. In a first step, the shadow optical fiber may be run, and extremely inexpensive Coax Fiber Terminal's (CFTs) installed that may consist of little more than upstream RF filters and electrical to optical converters. Then, as the system develops, more capable CFTs may be installed with more sophisticated DOCSIS upstream processors and more sophisticated optional GTTH downstream processors, and in this way the shadow optical fiber approach can incrementally upgrade households to full GTTH capability while still minimizing costs and maximizing use of legacy equipment.

Figure 6:
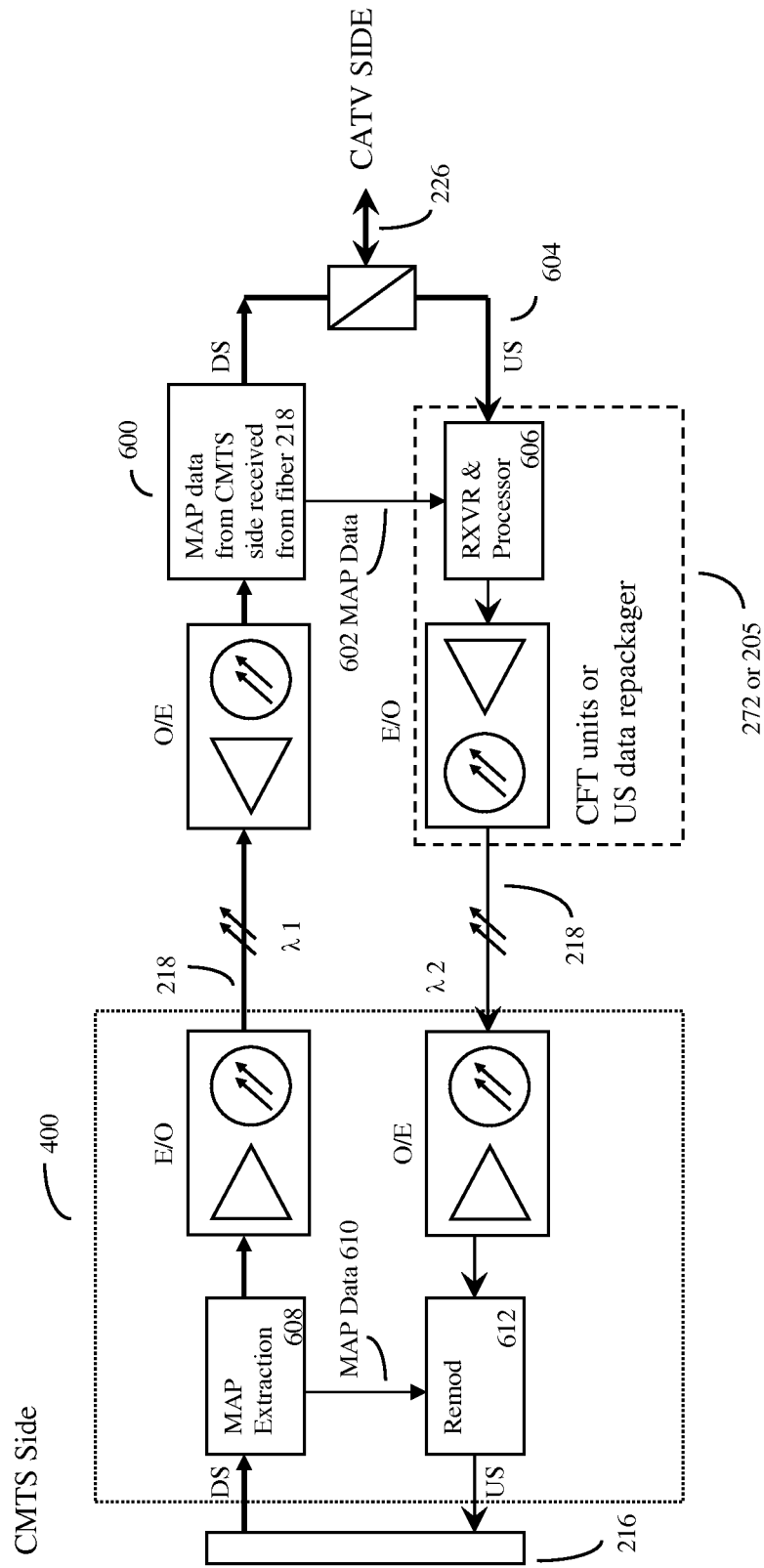
FIG. 6 shows an overview of how Mini-slot Allocation Packet (MAP) data may be used to analyze and extract the digital data encoded by the upstream signals. The upstream digital data may then be sent back to the cable head and the Cable Modem Termination System (CMTS) at the cable head using a more efficient digital protocol, such as a GigE protocol, along the HFC optical fiber. This upstream data can either be sent at a different wavelength from the downstream optical fiber signal, or alternatively can be sent back along a different optical fiber. At the CMTS end as desired, the same MAP data may be used, in conjunction with the digital data, to reconstitute the original upstream CATV RF signal, and this in turn may be fed into a legacy CMTS.

FIG. 6 shows an overview of how Mini-slot Allocation Packet (MAP) data (600), (602) may be used to analyze and extract the digital data encoded by the upstream signals (604). This process of analysis and digital data extraction may be done at different locations, such as at the Coax Fiber Terminals (272), or alternatively (particularly if the Coax Fiber Terminals simply pass along all upstream data without processing) at or near the optical fiber node (205). This step can be performed by a processor or DSP (606) that receives the upstream data, and uses the MAP data (602) to understand the timing (see FIG. 8) and assignment of the various time slices used to convey the upstream data from the various cable modems at the various neighborhood households. The upstream digital data may then be sent back to the cable head and the Cable Modem Termination System (CMTS) (216) at the cable head using a more efficient digital protocol, such as a GigE protocol, along the HFC optical fiber (218), often at a different wavelength ($\lambda 2$) from the downstream optical fiber signal ($\lambda 1$), or alternatively along a different optical fiber. At the CMTS end (216) as desired, the same MAP data (608) (610) may be used, in conjunction with the digital data (and possibly in decoder apparatus (400)) to reconstitute the original upstream CATV RF signal at a remodulator (612). This reconstituted upstream signal may in turn be fed into the CMTS (216), which may be a legacy CTMS, as desired. This helps leverage the cable industry's considerable investment in standard DOCSIS equipment, and helps reduce the costs and effort involved in providing additional functionality to the system's various users. Alternatively, when more advanced CTMS systems that are designed to directly interpret the upstream data are used, remodulation step (612) may be omitted.

Map extraction may be done by various methods. Since the CTMS processor generates MAP data, one of the simplest methods is simply to modify the CTMS processor software to send out (downstream) an easy to interpret form of the MAP data for use by the system, and communicate this MAP data down optical fiber (218) to the processor (606) that will be analyzing the neighborhood upstream data. Alternatively, less direct methods, such as sniffing methods discussed in Azenko and Rakib, U.S. Pat. No. 7,362,773 (incorporated herein by reference) may be used. In general, a broad range of alternative MAP extraction methods may be used for the invention. Often, however, it will be useful to extract the MAP data at the cable head end, and transmit this MAP data to the optical nodes (205) and Cable Fiber Terminals (272) at the CATV RF side of the system.

As one alternative MAP scheme, the MAP data may not be used for demodulating the upstream data at all, but rather simply be used to mask or "clean up" the upstream data. Here for example, the RF bursts sent out by various cable modems during times that the MAP data has allocated for that particular cable modem's upstream transmission time can simply be passed on as is (i.e. as a pure analog to analog pass through), while during the "dead" times when the MAP data indicates that a particular cable modem or set of cable modems is not allocated time to transmit, no signal may be passed on. Thus upstream RF transmissions during time periods or windows when upstream transmission by the cable modems attached to a particular Cable Fiber Terminal are not authorized may be masked. Here the net effect of this alternative scheme is to reduce the overall upstream noise, while preserving the upstream data. This sort of scheme can be useful in reducing interference that may be caused, for example, by inadvertent crosstalk between cable modems that are served by an alternative Cable Fiber Terminal, but through which some signals have inadvertently leaked to a region of the CATV cable served by a different Cable Fiber Terminal.

There are other alternative uses for the invention as well. For example, although cellular phone tower transmitters can transmit over relatively longer ranges because they have fewer power constraints, individual (portable) cell phone transmitters have severe power restrictions, and transmit with lower power. Thus it is more challenging to receive transmissions from various cell phones than it is to transmit to the cell phones. According to the invention, cell phone coverage may be extended by, for example, putting at least local cell phone company receivers on or near local neighborhood CATV cables, and utilizing the high upstream capacity of the shadow optical fiber to backhaul the local cell phone data to a more capable cellular phone tower or network located further away.

Figure 7:
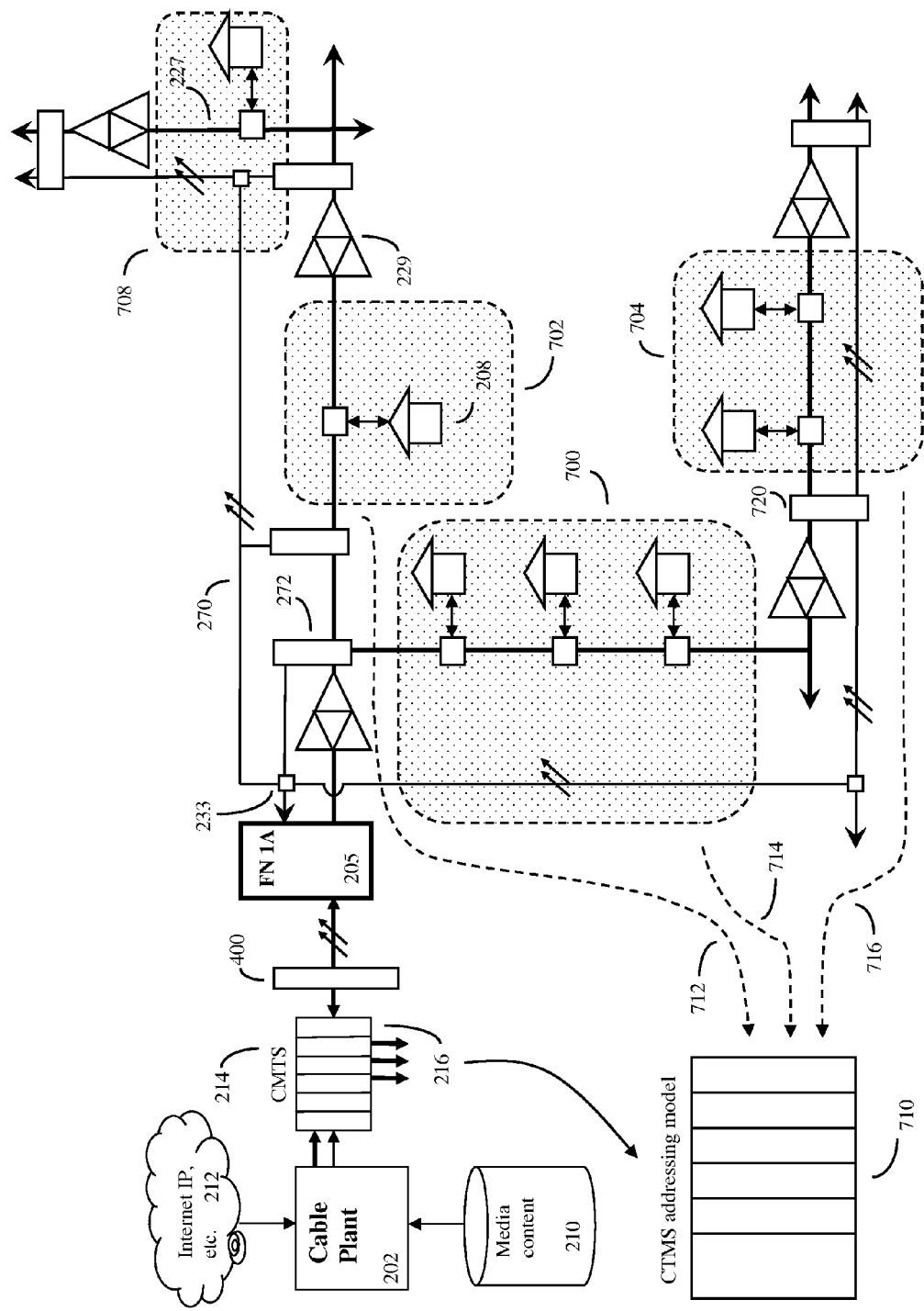
FIG. 7 shows one shadow fiber and Coax Fiber Terminal addressing scheme. Here either each Coax Fiber Terminal, or in some embodiments related groups of Coax Fiber Terminals are partitioned into different domains, and the cable modems served by their respective Coax Fiber Terminal are addressed by the cable plant or head end CTMS accordingly. In one simple scheme, the household cable modems falling within each Coax Fiber Terminal domain are handled by the CTMS as if they were simply small independent neighborhoods, thus partitioning what is really a larger CATV coax neighborhood into multiple virtual smaller neighborhoods. This scheme helps preserve backward compatibility with legacy CTMS and CTMS software.

FIG. 7 shows one shadow fiber and Coax Fiber Terminal addressing scheme. Here either each Coax Fiber Terminal, or in some embodiments related groups of Coax Fiber Terminals are partitioned into different domains (700), (702), (704), (708), and the cable modems in the various households (e.g. 208) served by their respective Coax Fiber Terminals (272) are addressed by the cable plant or head end CTMS accordingly. In one simple scheme, the household cable modems falling within each Coax Fiber Terminal domain are handled by the CTMS as if they were simply small independent neighborhoods, thus partitioning what is really a larger CATV coax neighborhood into multiple virtual smaller neighborhoods. This scheme helps preserve backward compatibility with legacy CTMS and CTMS software.

Here the addressing model used by CTMS (214) is shown as (710). Although the various domains (700, 702, 704, 708) served by the neighborhood CATV cable served by fiber node 1A (205) are actually part of the same CATV coax system, for purposes of at least handling the upstream data, the addressing scheme used by the CTMS (710) can treat these various domains (700, 702, 704, 708) as if they were simply small independent neighborhood CATV cables, each connecting to the CTMS by their own respective slots (712, 714, 718). This scheme helps preserve legacy CTMS hardware and software, as well as other legacy cable head systems. Alternative domain addressing schemes may also be used.

Thus here, the CATV trunk cable or branch CATV cables, and the various Coax Fiber Terminals can be addressed as multiple domains, so that one set of cable devices (such as cable modems) attached the CATV trunk and branch cable arrangement that is local to and served by a first Coax Fiber Terminal (e.g. 720) may be addressed on a first domain basis (e.g. domain 704), and other sets of cable devices attached to said at least one CATV trunk cable or at least some of said plurality of branch CATV cables that is local to and serviced by a second Coax Fiber Terminal (e.g. 272) may be addressed on a second domain basis (e.g. domain 700).

Although often it will be convenient to designate each group of households served by a particular Cable Fiber Terminal as having its own unique address or CMTS slot, in alternative embodiments, as desired, multiple domains may be combined and addressed as a unit. Thus for example in an alternative scheme, domains (700) and (704) might be addressed as a single "virtual neighborhood CATV cable" by the CTMS (214, 710), while domains (702) and (708) might be addressed as a different "virtual neighborhood CATV cable" by the CTMS (214, 710). Although potentially limiting the upstream data rate capability, such domain pooling arrangements may be useful for simplifying addressing schemes, preserving compatibility with legacy CTMS and other equipment which may have a limited number of available slots or neighborhood ports, and for other purposes as well.

In at least some embodiments, it may be useful to endow the Cable Fiber Terminal with at least one processor and software that enables the Cable Fiber Terminal to keep track of exactly which cable modems or Ethernet terminals are within the sphere of coverage or domain of that particular Cable Fiber Terminal. This simplifies management and control of the system.

Figure 8:
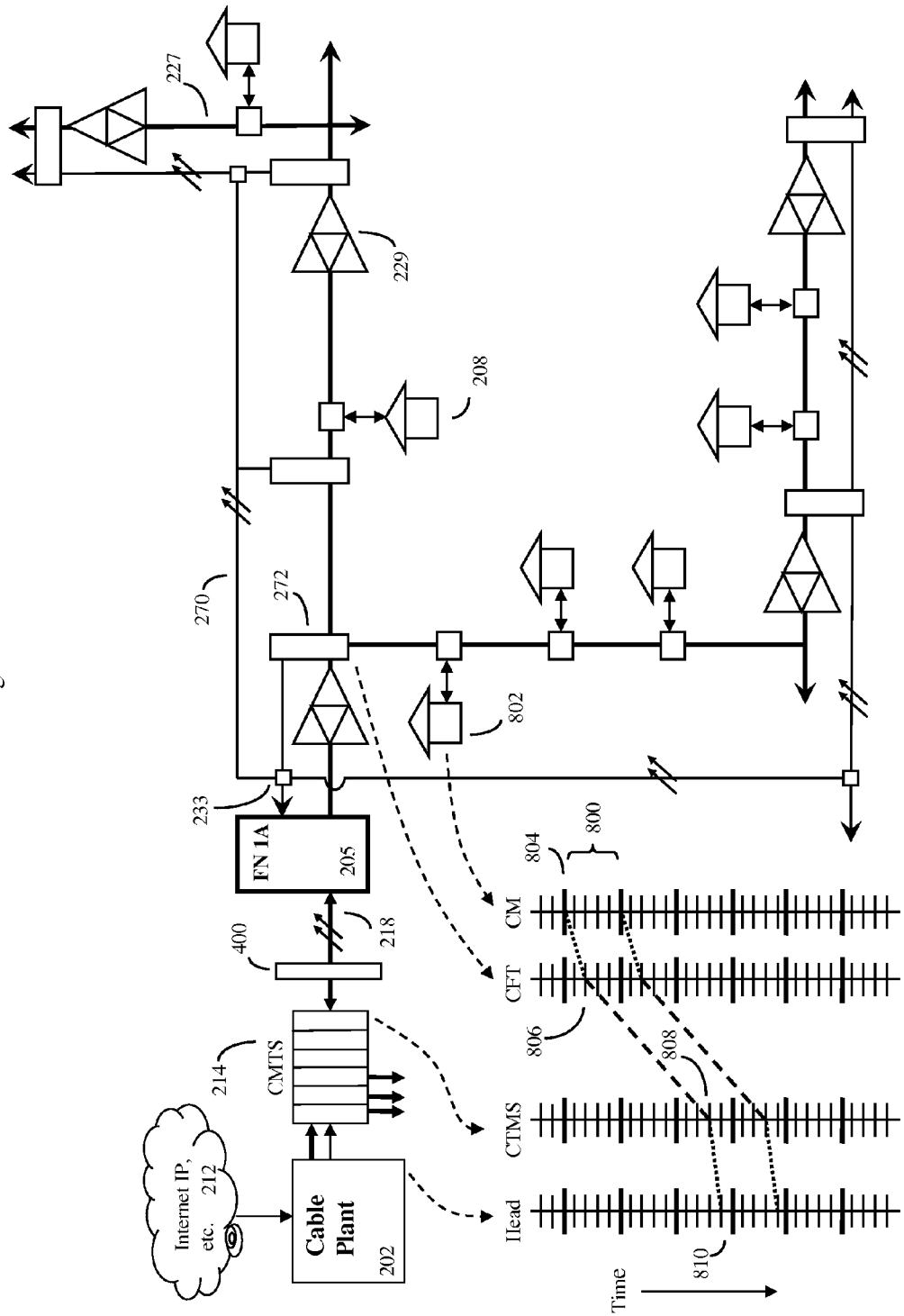
FIG. 8 shows a detail of some of the timing problems that must be addressed by the Head end and CTMS system, as well as the various Coax Fiber Terminals when MAP data are used to demodulate upstream cable modem signals, and the data from the demodulated signals are transported upstream (often in an alternative format), and then reconstituted or regenerated back into RF signals before being fed into a CTMS, such as a legacy CTMS. Due to speed of light and other system delays, the timing periods relative to the mini slot boundaries and 10.24 MHz system clock will shift depending upon which Cable Fiber Terminals (CFT) and Cable modems (CM) are active, and the system must correct for these timing differences.

FIG. 8 shows a detail of some of the timing problems that must be addressed by the Head end and CTMS system, as well as the various Coax Fiber Terminals when MAP data are used to demodulate upstream cable modem signals, and the data from the demodulated signals are transported upstream (often in an alternative format), and then reconstituted or regenerated back into RF signals before being fed into a CTMS, such as a legacy CTMS. Due to speed of light and other system delays, the timing periods relative to the mini slot boundaries and 10.24 MHz system clock will shift depending upon which Cable Fiber Terminals (CFT) and Cable modems (CM) are active, and the system must correct for these timing differences.

In this example, data (e.g. an upstream RF burst 800) originating from a cable modem located inside of household (802) originates at one mini-slot time boundary (804), and due to conversion time and speed of light issues, this upstream RF burst arrives at the Cable Fiber Terminal (272) at later time (806). By the time this upstream RF burst data has been handled and possibly demodulated or repackaged by Cable Fiber Terminal (272), time that the data carried by the original RF burst has been processed by other devices (e.g. possibly by Optical Fiber Node (205) or other systems) and has been transported upstream over optical fiber (218), the timing been displaced still further forward in time (808). By the time the data carried by the original RF burst reaches the head end (810), still more time may have passed.

In order to cope with the timing differences, particularly when MAP data is being used to either demodulate the original cable modem upstream data (e.g. data originating from the cable modem in household (802)), or when MAP data is at least used to designate timing windows for receiving data for noise clean-up purposes, various systems, such as the Cable Fiber Terminal and other devices may contain processors and software designed to allow the cable operator to synchronize the timing of the various Cable Fiber Terminals and other peripherals, and to send timing adjust data back and forth between the Cable Fiber Terminals, the CTMS, and optionally the cable modems and other devices as well so as to ensure that the timing of the upstream signals (and optionally also the downstream signals) is properly adjusted for system delays.

In alternative embodiments, depending upon how much backward compatibility with legacy equipment is desired, the shadow optical fiber/Cable Fiber Terminal system may be used to more flexibly partition the CATV cable between upstream and downstream modes by designating very large blocks of CATV cable spectrum for use for a TDD (Time Division Duplex) data transmission scheme. In embodiments were good backward compatibility is desired, these TDD schemes may be relegated to presently unused or lesser used portions of the CATV cable spectrum, such as the 1 GHz+ frequency range. This scheme is shown in FIG. 9.

Figure 9:
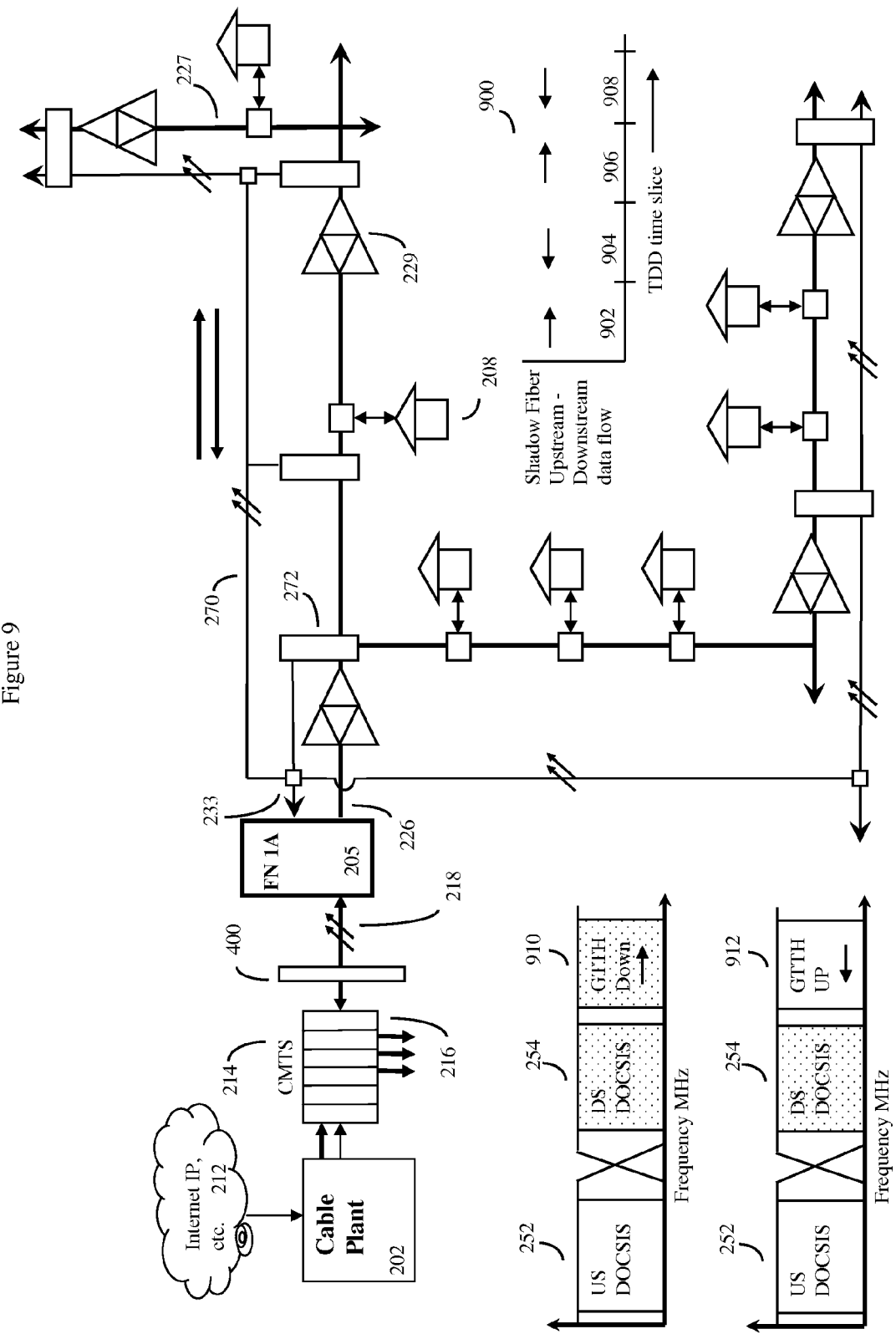
FIG. 9 shows an alternative shadow optical fiber/Cable Fiber Terminal modulation scheme, in which some or all of the CATV bandwidth is switched between downstream mode and upstream mode following a Time Division Duplex scheme. In one scheme, to preserve backward compatibility, only the presently unused portions of the CATV RF spectrum, such as the 1 GHz+ region, are used for TDD upstream/downstream transmission. In an alternative scheme, backward compatibility can be sacrificed, and up to the entire CATV RF spectrum from 5 MHz to 1 GHz plus, or from 54 to 1 GHz plus, can be allocated for TDD upstream/downstream transmission.

FIG. 9 shows an alternative shadow optical fiber/Cable Fiber Terminal modulation scheme, in which some or all of the CATV bandwidth is switched between downstream mode and upstream mode following a Time Division Duplex scheme (900). Here, depending on the TDD time slice (902, 904, 906, 908), the shadow optical fiber system (270) and Cable Fiber Terminals (272) may transition between downstream data transmissions (902, 906) and upstream data transmissions (904, 908). This partitioning between downstream and upstream need not be on a strictly 50:50 basis, but can be adjusted, and even dynamically adjusted, by the cable operator depending upon the needs of that particular neighborhood. Thus a neighborhood with unusually high downstream needs might have the TDD time slices allocated on a 90:10 downstream/upstream basis, while a neighborhood with unusually high upstream needs might get a 40:60 downstream/upstream TDD time allocation.

As previously discussed, to maintain backward compatibility, large stretches of the CATV spectrum, such as the legacy 5-42 MHz upstream region (252), and the standard downstream 54-533, 750, or 850 MHz range (254) may remain as before, and the TDD mode invoked only for other frequency ranges, such as the 1 GHz plus range (910, 912). Thus in one TDD set of time slices (902, 906), the entire 1 GHz frequency range (910) could be shifted into downstream mode, while in a different set of TDD time slices (904, 908), the entire 1 GHz frequency range could be shifted into upstream mode (912).

In an alternative scheme, backward compatibility can be sacrificed, and up to the entire CATV RF spectrum from 5 MHz to 1 GHz plus, or from 54 to 1 GHz plus, can be allocated for TDD upstream/downstream transmission. As needed, legacy cable modems and other equipment may continue to operate with this scheme by use of suitable gateway systems that can translate between the inventions TDD methods and prior art CATV protocols. Examples of such suitable gateways are discussed in provisional application 61/385,125, the contents of which are incorporated herein by reference.

The invention claimed is:

1. A method for enhancing the legacy and non-legacy upstream data carrying capacity of a hybrid fiber cable (HFC) network with a cable head, at least one trunk optical fiber, at least one trunk optical fiber node terminating on at least one CATV trunk cable, said CATV trunk cable at least partially legacy RF signal connected to a plurality of CATV active devices, with at least one branch CATV cables at least partially legacy RF signal connected to said plurality of CATV active devices, thus forming an at least partially legacy RF signal connected CATV Tree and Branch Network, and a plurality of legacy RF signal compatible cable modems or Ethernet terminals connected to said CATV Tree and Branch Network, said method comprising:

running at least one shadow optical fiber from said trunk optical fiber to Coax Fiber Terminals;

wherein said Coax Fiber Terminals are connected to said CATV cable and intercept some but not all local legacy and non-legacy upstream CATV RF signals being transmitted by those cable modems or Ethernet terminals connected to said trunk or branch CATV cables, thereby partitioning said CATV Tree and Branch Network into a plurality of different CATV cable domains, at least some of said domains connected to a plurality of households;

wherein within a domain, said households share the same upstream and downstream legacy and non-legacy RF signals along the same stretch of CATV cable, and wherein said households need not directly connect to said Coax Fiber Terminals;

wherein between domains, said households do not share all of the same legacy upstream and legacy downstream RF signals, but do share at least some of the same original legacy downstream RF signals;

using said Coax Fiber Terminals to intercept said local legacy upstream CATV RF signals and remove at least some but not all of said upstream legacy CATV RF signals from said trunk or branch CATV cables connected to said CATV active devices, and backhaul at least the information carried by the removed upstream legacy CATV RF signals using said at least one shadow optical fiber.

2. The method of claim 1, wherein said upstream legacy CATV RF signals comprise signals selected from the group consisting of DOCSIS, DVB, Aloha, and other legacy non-DOCSIS signals, and wherein at least some but not all of said DOCSIS signals are removed by said Coax Fiber Terminals and backhauled using said shadow optical fibers.

3. The method of claim 1, wherein said at least one shadow optical fiber comprises a passive optical network.

4. The method of claim 1, wherein said Coax Fiber Terminals operate by the steps of:

1: digitizing at least some but not all of said upstream legacy CATV RF signals;

2: transducing at least some of the digitized upstream legacy CATV RF signals to optical signals, producing upstream optical signals.

5. The method of claim 4, wherein the steps of digitizing said upstream legacy CATV RF signals are done by the steps of:

A: obtaining Mini-slot Allocation Packet (MAP) data for at least some of said upstream legacy CATV RF signals;

B: using said Mini-slot Allocation Packet (MAP) data to demodulate and extract at least some of the upstream digital information carried by at least some of said upstream legacy CATV RF signals;

C: repackaging said upstream digital information in an alternative non-legacy format for optical transmission; and D: transmitting said upstream digital information in said alternative non-legacy format along said shadow optical fiber.

6. The method of claim 5, wherein said alternative non-legacy format is an optical Ethernet format.

7. The method of claim 5, further using said Mini-slot Allocation Packet (MAP) data to subsequently remodulate said upstream digital information into reconstituted upstream legacy CATV RF signals at said cable head, producing reconstituted upstream legacy CATV RF signals; and supplying said reconstituted upstream legacy CATV RF signals to a Cable Modem Termination System.

8. The method of claim 4, wherein the steps of digitizing said upstream legacy CATV RF signals are done by the steps of:

A: sampling the upstream legacy CATV RF signals at a sample rate that is at least twice the frequency of the highest upstream legacy CATV RF signal frequency;

B: performing an analog to digital conversion on said sampled upstream legacy CATV RF signals producing digitized upstream non-legacy CATV signals.

9. The method of claim 8, subsequently remodulating said digitized upstream non-legacy CATV RF signals into reconstituted upstream legacy CATV RF signals at said cable head, producing reconstituted upstream legacy CATV RF signals, and;

and supplying said reconstituted upstream legacy CATV RF signals to a Cable Modem Termination System.

10. The method of claim 1, wherein at least some original remaining upstream legacy CATV RF signals continue to be transmitted along said CATV Tree and Branch Network after at least some legacy CATV RF signals have been intercepted and removed by said Coax Fiber Terminals.

11. The method of claim 10, wherein said Coax Fiber Terminals actively regenerate said at least some remaining upstream legacy CATV RF signals and pass said remaining upstream legacy CATV RF signals back onto the CATV trunk cable after first removing and digitizing some but not all of said upstream legacy CATV RF signals.

12. The method of claim 1, wherein said at least one CATV trunk cable or at least some of said plurality of branch CATV cables, and a plurality of Coax Fiber Terminals are addressed as a plurality of legacy RF signal domains, so that one set of legacy cable devices attached to said at least one CATV trunk cable or at least some of said plurality of branch CATV cables that is local to and served by a first Coax Fiber Terminal may be addressed on a first legacy RF signal domain basis, and other sets of legacy cable devices attached to said at least one CATV trunk cable or at least some of said plurality of branch CATV cables that is serviced by a second Coax Fiber Terminal may be addressed on a second legacy RF signal domain basis.

13. The method of claim 1, wherein Mini-slot Allocation Packet (MAP) data is used to mask upstream RF signals according to time windows designated for upstream transmission, thereby reducing the amount of noise in the upstream data that is carried by said shadow optical fiber.

14. The method of claim 1, further using said at least one shadow optical fiber and said Coax Fiber Terminals to transmit downstream non-legacy Gigabit Ethernet data; and modulating said non-legacy downstream Gigabit Ethernet data into downstream legacy CATV RF signals at said Coax Fiber Terminals.

15. The method of claim 1, further using said at least one shadow optical fiber and said Coax Fiber Terminals to transmit upstream and downstream data according to a Time Division Duplex scheme.

16. The method of claim 1, wherein said Coax Fiber Terminals backhaul said information by performing a direct electrical to optical conversion of said intercepted upstream legacy and non-legacy CATV RF signals.

17. A method for enhancing the legacy and non-legacy upstream data carrying capacity of a hybrid fiber cable (HFC) network with a cable head, at least one trunk optical fiber, at least one trunk optical fiber node terminating on at least one CATV trunk cable, said CATV trunk cable at least partially legacy RF signal connected to a plurality of CATV active devices, with at least one branch CATV cables at least partially legacy RF signal connected to said plurality of CATV active devices, thus forming an at least partially legacy RF signal connected CATV Tree and Branch Network, and a plurality of legacy RF signal compatible cable modems or Ethernet terminals connected to said CATV Tree and Branch Network, said method comprising:

running at least one shadow optical fiber from said trunk optical fiber to Coax Fiber Terminals;

wherein said Coax Fiber Terminals are connected to said CATV cable and intercept local legacy and non-legacy upstream CATV RF signals being transmitted by those cable modems or Ethernet terminals connected to said trunk or branch CATV cables, thereby partitioning said CATV Tree and Branch Network into a plurality of different CATV cable domains, at least some of said domains connected to a plurality of households;

wherein within a domain, said households share the same upstream and downstream legacy and non-legacy RF signals along the same stretch of CATV cable, and wherein said households need not directly connect to said Coax Fiber Terminals;

wherein between domains, said households do not share all of the same legacy upstream and legacy downstream RF signals, but do share at least some of the same legacy downstream RF signals;

using said Coax Fiber Terminals to intercept said local legacy upstream CATV RF signals and remove at least some of said upstream legacy CATV RF signals from said trunk or branch CATV cables connected to said CATV active devices, and backhaul at least the information carried by the removed upstream legacy CATV RF signals using said at least one shadow optical fiber.

18. The method of claim 17, wherein at least some original remaining upstream legacy CATV RF signals continue to be transmitted along said CATV Tree and Branch Network after at least some legacy CATV RF signals have been intercepted and removed by said Coax Fiber Terminals.

19. The method of claim 17, further using said at least one shadow optical fiber and said Coax Fiber Terminals to transmit upstream and downstream data according to a Time Division Duplex scheme.

20. The method of claim 17, wherein said Coax Fiber Terminals backhaul said information by performing a direct electrical to optical conversion of said intercepted upstream legacy and non-legacy CATV RF signals.

* * * * *